United States Patent [19]
Leek

[11] Patent Number: 5,467,570
[45] Date of Patent: Nov. 21, 1995

[54] TENSION TIE

[75] Inventor: William F. Leek, Anaheim, Calif.

[73] Assignee: Simpson Strong-Tie Co., Inc., Pleasanton, Calif.

[21] Appl. No.: 321,909

[22] Filed: Oct. 12, 1994

[51] Int. Cl.$^6$ ............................................. E04C 5/00
[52] U.S. Cl. ..................... 52/712; 52/714; 403/232.1; 403/190
[58] Field of Search .................... 52/702, 712, 714, 52/289, 295, 715; 403/232.1, 190, 262

[56] References Cited

U.S. PATENT DOCUMENTS 4,192,118  3/1980  Gilb ........................................ 52/714
5,092,097  3/1992  Young ..................................... 52/702

Primary Examiner—Carl D. Friedman
Assistant Examiner—Creighton Smith
Attorney, Agent, or Firm—James R. Cypher

[57] ABSTRACT

A single piece tension tie connection for tyhing a wood, or steel structural frame member to a wood, steel or concrete structural base member. The tension tie consists of an elongated strap member having triangular shaped side members with four seat members integrally connected to the strap and side members so that the four seat members are locked together and act as a unit in withstanding bending forces imposed by large tension forces imposed on the strap. The entire tension tie is a single member requiring no welding or separate washers.

7 Claims, 5 Drawing Sheets

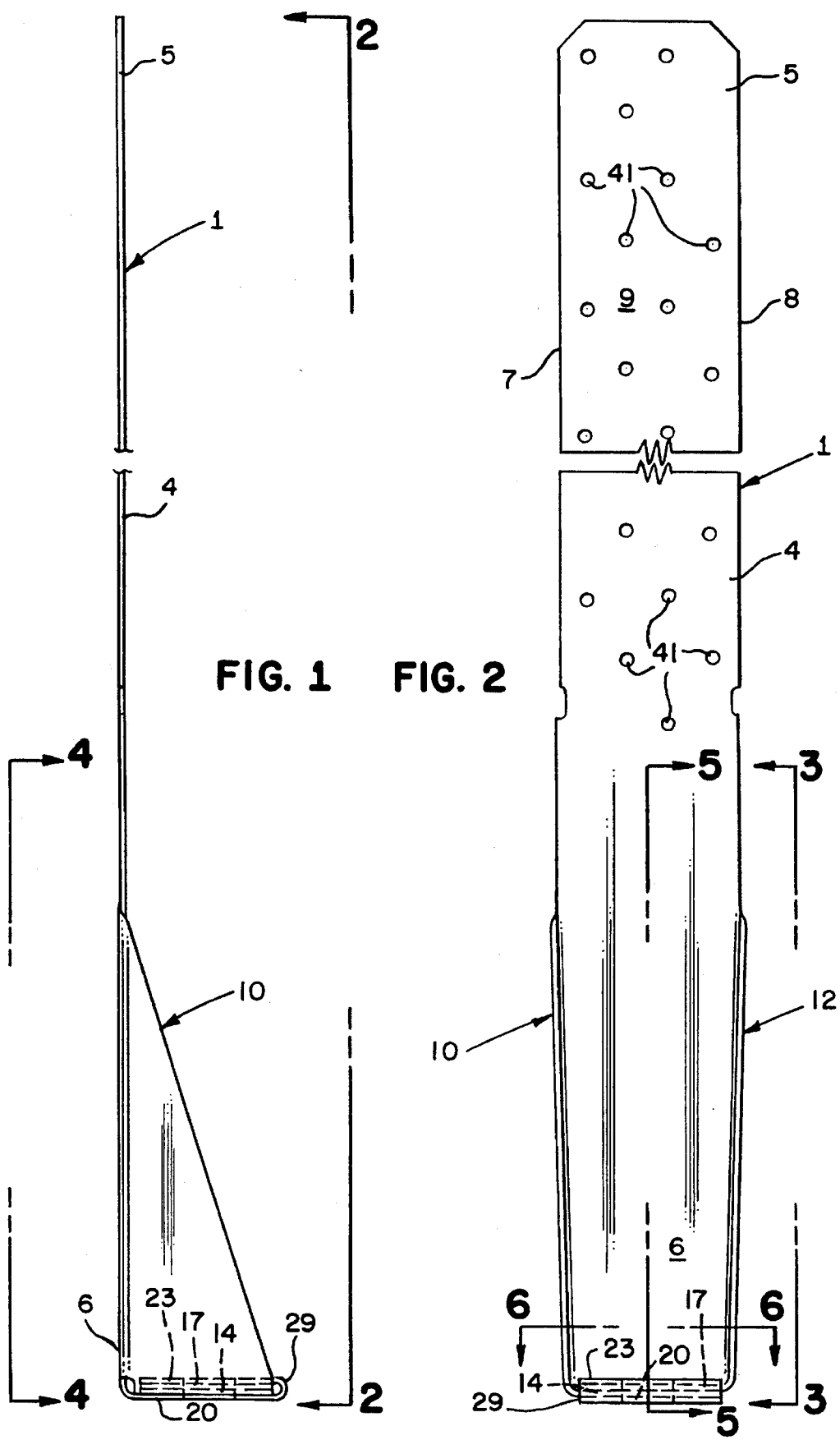

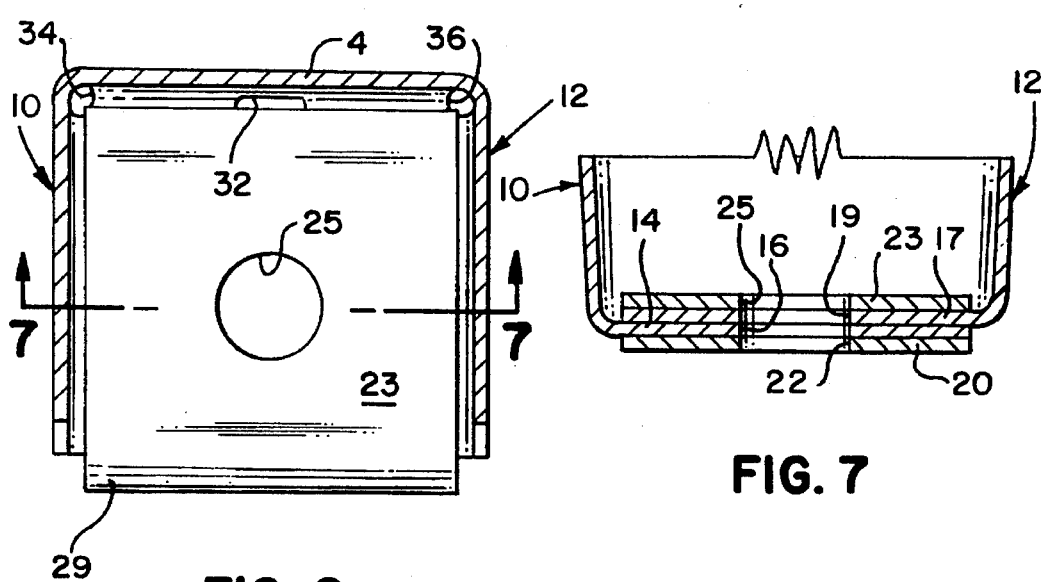
FIG. 6
FIG. 7
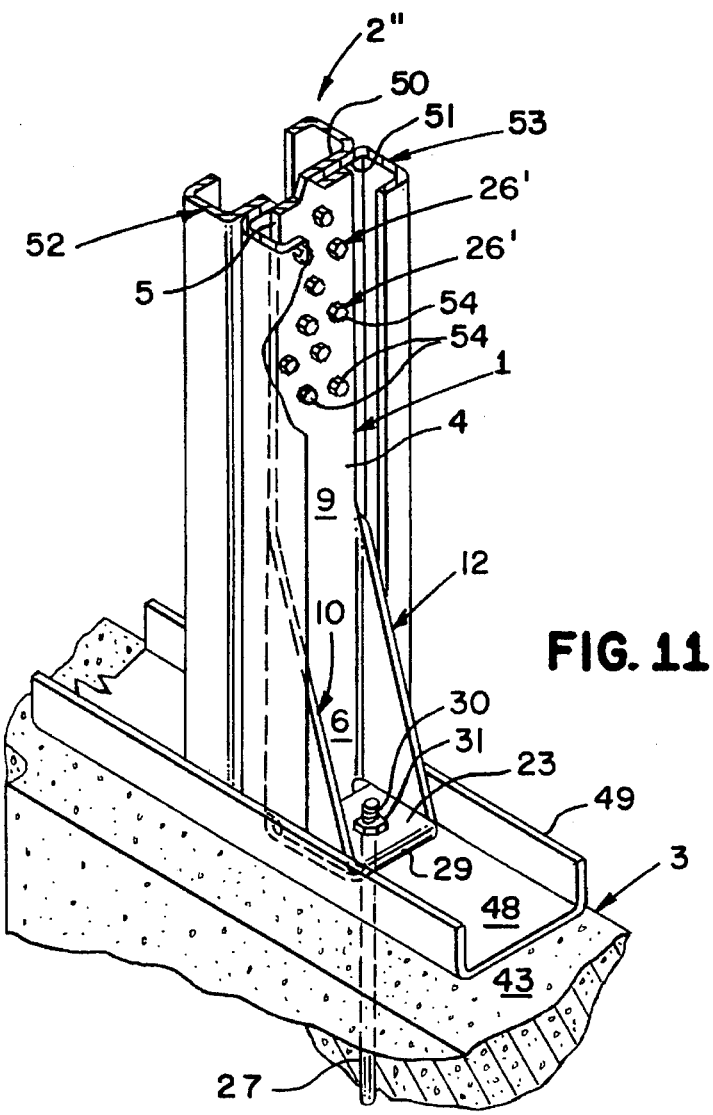
FIG. 11

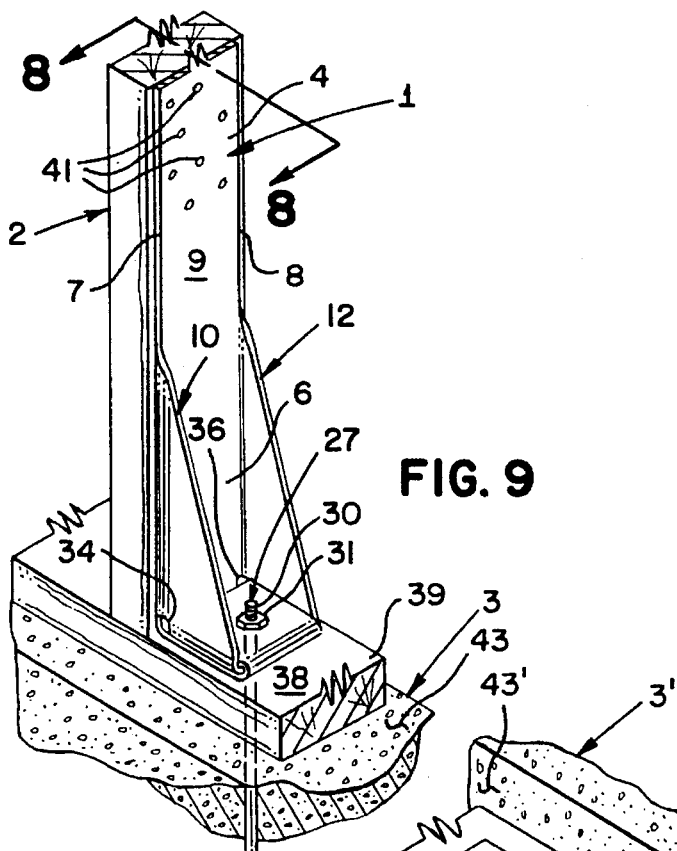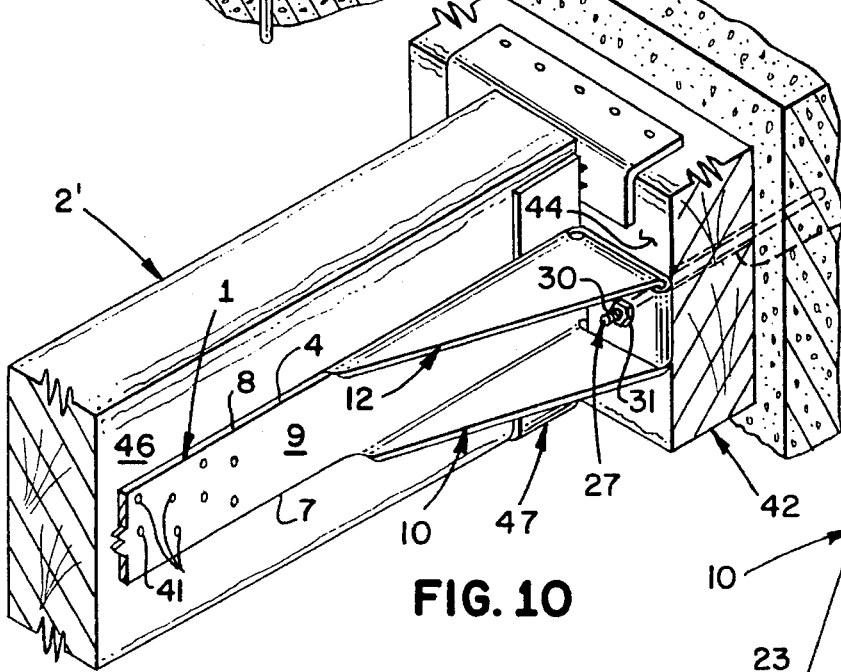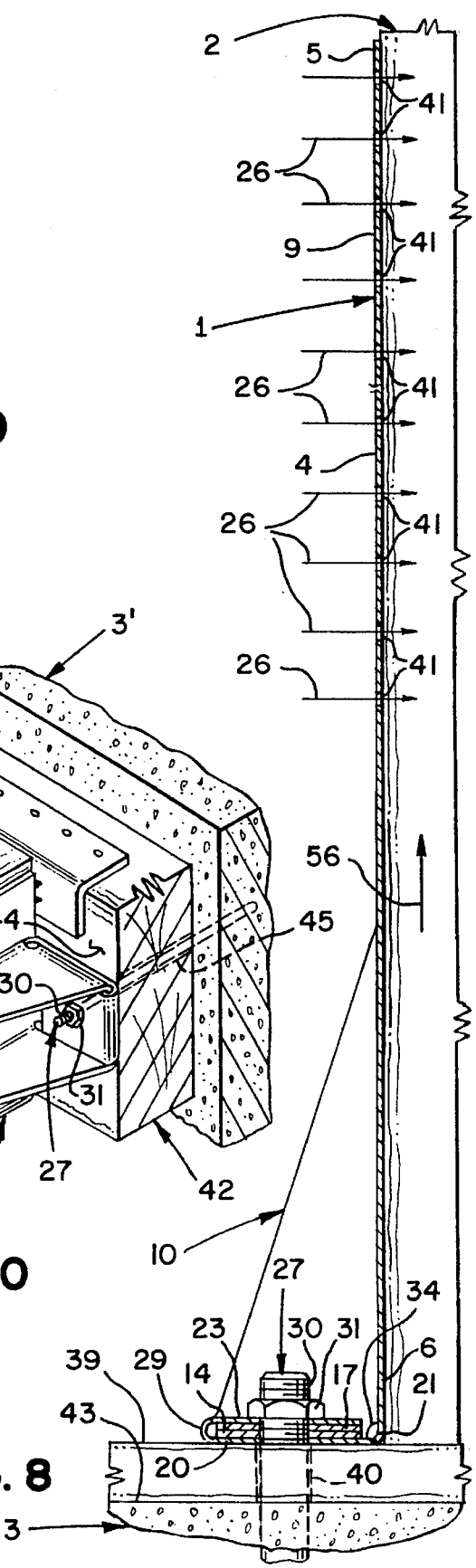

5,467,570

TENSION TIE

BACKGROUND OF THE INVENTION

The tension tie of the present invention is a metal connector used to hold two structural elements in a wood frame building together in such cataclysmic events as earthquakes, hurricanes and typhoons. Such tension ties are used in addition to those connectors and fasteners used in standard building practice. The tension ties may be used in the initial construction or in retrofit work. The most common use of the present tension tie is in attaching the wood frame of the building to the concrete foundation.

Holdowns which are bolted to the wood frame are shown in Commins et.al. U.S. Pat. No. 4,665,672 granted May 19, 1987, Jensen U.S. Pat. No. 4,825,621 granted May 2, 1989, and Silver 1991 catalog. Since the wood frame places a tension load on the tension tie, removal of wood to form the bolt holes weakens the wood frame and diminishes the ability of the tension tie to hold the frame of the building to the foundation.

Commins, U.S. Pat. No. 4,744,192 granted May 17, 1988 teaches the use of an elongated strap fastened to a separate holdown by means of a rivet. The elongated strap is attached to the wood frame by nails or screws and eliminates the bolt holes in the wood frame, but Commins '192 requires the use of four separate members in the construction of his tension tie.

Silver, 1991 catalog teaches a one piece tie down with a triple seat but lacks a locking means for clamping the seats together so that they act as a unit and do not bend in series as tension load is applied to the connector.

SUMMARY OF THE INVENTION

The gist of the present invention is the use of a single piece metal member which can be attached to a wood frame member by nails or screws and is attached to another structural member. Four interleaved seat members are clampingly interlocked together so that they act as a unit in transmitting tension forces. The ability to hold larger forces is increased over comparable size tension ties.

A primary feature of the present tension tie is that it may be constructed without welding or painting.

Another feature is that no separate washers are required which add to the cost of assembling, packing, shipping and installing.

BRIEF DESCRIPTION OF THE DRAWINGS

FIG. 1 is a side elevation view of the tension tie of the present invention.

FIG. 2 front elevation view of the tension tie illustrated in FIG. 1 taken in the direction of line 2—2.

FIG. 6 is a cross sectional view of the tension tie taken along line 6—6 of FIG. 2.

FIG. 7 is a cross sectional view of a portion of the tension tie taken along line 7—7 of FIG. 6.

FIG. 8 is a cross sectional view of the tension tie of FIG. 9 taken generally along line 8—8.

FIG. 9 is a perspective view of a portion of the tension tie of the present invention connecting a wood stud of a building frame resting on a mudsill with the tension tie connected to an anchor bolt embedded in a concrete foundation.

FIG. 10 is a perspective view of a portion of the tension tie of the present invention with the tension tie connecting a joist member in a wood frame construction seated against a ledger wood member and connected to an anchor bolt embedded in a vertical concrete wall.

FIG. 11 is a perspective view of the tension tie of the present invention connecting a pair of steel studs to a an anchor bolt embedded in a concrete foundation.

DESCRIPTION OF THE PREFERRED EMBODIMENT OF THE INVENTION

Figure 3:
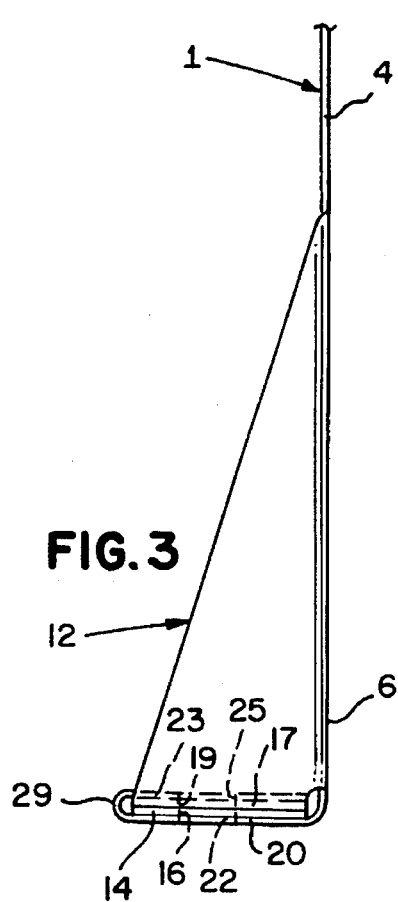
FIG. 3 is a side elevation view of a portion of the tension tie illustrated in FIG. 2 taken in the direction and within the scope of line 3—3.
Figure 4:
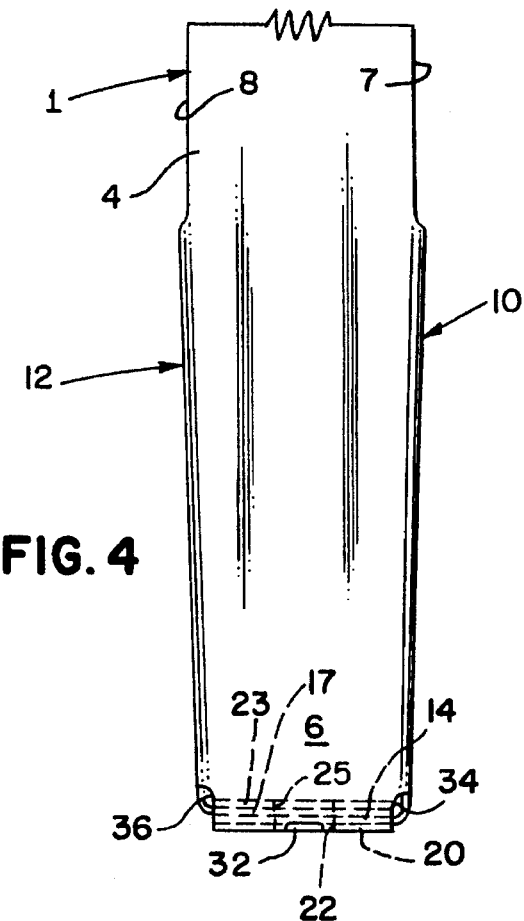
FIG. 4 is a rear elevation view of a portion of the tension tie illustrated in FIG. 1 taken in the direction and within the scope of line 4—4.
Figure 5:
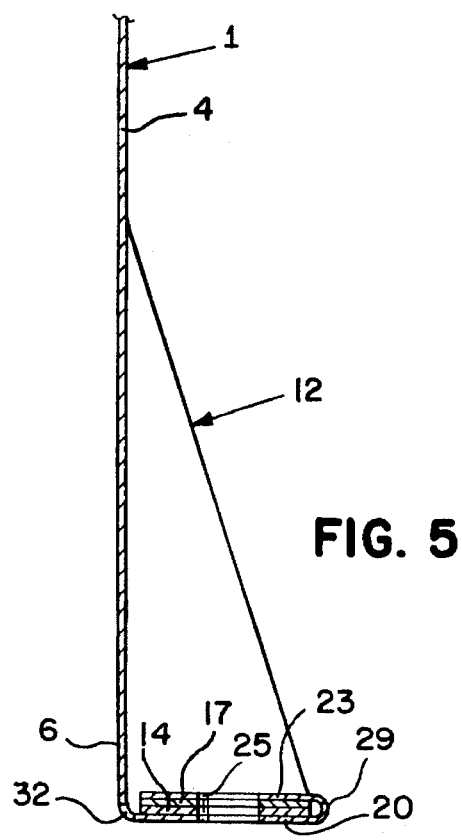
FIG. 5 is a cross sectional view of a portion of the tension tie taken along line 5—5 of FIG. 2.

The connection of the present invention includes a single piece tension tie 1 for tying a wood, or steel structural frame member 2 to a wood, steel or concrete structural base member 3 including: an elongated strap member 4 having a distal end 5 and a proximal end 6, first and second spaced side edges 7 and 8 and a generally planar face 9; a first side member 10 having a generally triangular shape integrally connected to a portion of the first side edge 7 of the elongated strap member 4 along a first side generally 90° bend line 11; a second side member 12 having a generally triangular shape integrally connected to a portion of the second side edge 8 of the elongated strap member 4 along a second side generally 90° bend line 13 and positioned in generally parallel spaced relation to the first side member 10; a first seat member 14 integrally connected to a portion of the first side member 10 along a first seat bend line 15 and formed with a first seat opening 16 therethrough; a second seat member 17 integrally connected to a portion of the second side member 12 along a second seat bend line 18 for overlapping registration with the first seat member 14 and formed with a second seat opening 19 therethrough located for general registration with the first seat opening 16; a third seat member 20 integrally connected to the proximal end 6 of the elongated strap member 4 at a generally 90° back bend line 21 for underlapping the first and second seat members 14 and 17 and formed with a third seat opening 22 therethrough located for general registration with the first and second seat openings 16 and 19; a fourth seat member 23 integrally connected to the third seat member 20 at a fourth seat bend line 24 for overlapping the first, second and third seat members 14, 17, and 20 and formed with a fourth seat opening 25 therethrough located for general registration with the first, second, and third seat openings 16, 19, and 22; shear fastener means 26 for insertion through the elongated strap member 4 for connection to the structural frame member 2; and tension fastener means 27 for insertion through the first, second, third and fourth seat openings 16, 19, 22, and 25 for attachment of the single piece tension tie to the structural base member 3.

Preferably, tension fastener means 27 is formed at its proximal end with bolt threads 30; and a threaded nut 31 dimensioned for threadable engagement with the bolt threads 30 clampingly engages the seat members 14, 17, 20, and 23.

Single piece tension tie 1 as previously described may also include: a seat extension member 29 connected to the third seat member 20 and the fourth seat member 23 and be formed in a 180° curved bend between the generally third seat bend line 24 and a fourth seat bend line 28.

Figure 12:
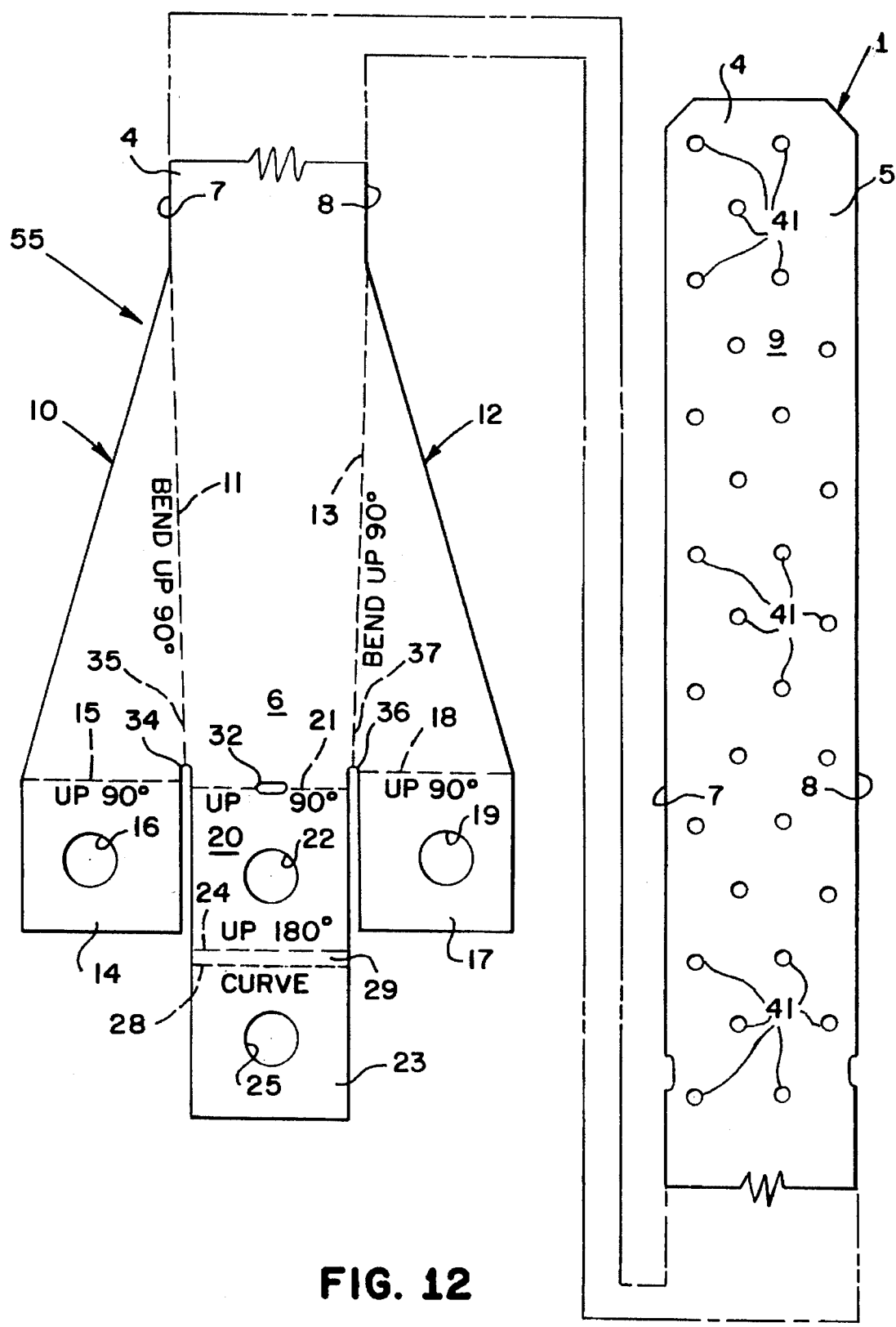
FIG. 12 is a plan view of a blank of metal prior to bending into the tension tie of the present invention. The strap member is broken so that the entire tension tie may be illustrated on one sheet of drawings.

As best shown in FIGS. 2 and 12, the first side bend line 11 and the second side bend line 13 may be formed as converging lines resulting in a tapering of the elongated strap 4 member in the proximal end portion.

Referring to FIG. 12, weakened bend line means 32 are formed along the generally 90° back bend line 21. The weakened bend line means 32 may consist of score lines, or punched openings as shown in the drawings.

Also best shown in FIG. 12, first seat bend line 15 is preferably superposed above the back bend line 21, and second seat bend line 28 is superposed above the first seat bend line 15.

Referring again to FIG. 12, first notch 34 may be formed in the seat end 35 of the first side bend line; and second notch 36 may be formed in the seat end 37 of the second side bend line 13.

One of the primary uses of the tension tie 1 of the present invention is to connect a wood building frame member 1 to a concrete foundation 3 as illustrated in FIGS. 8 and 9. The third seat member 20 rests on the upper face 38 of mudsill 39 with first, second, third and fourth seat openings 16, 19, 22, and 25 in registration with an opening 40 in mudsill 39 and with tension fastener means 27, such as a bolt, inserted therethrough. After threaded nut 31 has been threadably placed on bolt threads 30 and tightened with a wrench so that third seat member 20 is pressed tightly against upper face 38 of mudsill 39 which in turn is pressed tightly against face 43 of structural base member 3, shear fastener means 26 such as nails or screws, are inserted through fastener openings 41 in elongated strap member 4.

In another use of the tension tie 1 of the present invention, a ledger board 42 is mounted on face 43' of concrete wall 3' by means not shown. Third seat member 20 is placed on face 44 of ledger board 42 with first, second, third and fourth seat openings 16, 19, 22, and 25 in registration with bore hole opening of ledger board 42 and with bolt 27 inserted therethrough. Elongated strap member 4 is placed against face 46 of structural frame member 2' which in this case is a wood beam mounted on ledger board 42 by means of a metal hanger 47 which forms no part of the invention. Threaded nut 31 is threadably mounted on tension fastener means 27 as previously described and tightened with a wrench, not shown, which connects the structural frame member 2' securably to the concrete wall 3' so that first, second, third, and fourth seat members 14, 17, 20, and 23 are firmly pressed against face 44 of ledger 42 and ledger 42 is pressed firmly against face 43' of concrete wall 3'.

FIG. 11 illustrates the single piece tension tie 1 used in the increasingly popular steel frame house. The third seat member 20 is placed on upper surface 48 of steel channel 49 so that first, second, third and fourth seat openings 16, 19, 22, and 25 register with an opening (not shown) in channel member 48 with tension fastener means 27 inserted therethrough. Connection is made by threadably mounting nut 31 on bolt threads 30 of tension fastener means 27 and turning mounting nut 31 with a wrench until first, second, third, and fourth seat members 14, 17, 20, and 23 are tightly pressed against steel upper surface 48 of steel channel 49 which in turn is in tight engagement with face 43 of structural base member 3. Elongated strap member 4 is connected to web members 50 and 51 of structural frame member 2" which in this case consists of steel studs 52 and 53. Shear fastener means 26' here illustrated may be self drilling screws with hex heads.

Preferably, the single piece tension tie 1 is constructed from a 14 gauge sheet metal blank 55 as illustrated in FIG. 12. First seat member 14 is folded upwardly 90° along first seat bend line 15, and second seat member 17 is folded upwardly 90° along second seat bend line 18. First side member 10 then folded upwardly 90° along first side bend line 11, and second side member 12 is folded upwardly 90° along second side bend line 13. Second seat member 17 now overlays first seat member 14. Next, third seat member 20 is folded upwardly 90° along back bend line 21 so that third seat member 23 underlies first seat member 14. Finally fourth seat member 23 is folded 180° with respect to third seat member 20 by bending along third seat bend line 24 and fourth seat bend line 28 so that fourth seat member 23 is overlying relation to second seat member 17. Folding is precisely accomplished so that first, second, third and fourth seat openings 16, 19, 22, and 25 are in registration with one another.

In a commercial version of the tension tie 1 of the present invention, the elongated strap member 4 is formed from 12 gauge sheet metal which may be galvanized and is formed with a width of 2½" and a length of 21 9/16". When dimensioned to be connected to a 5/8" anchor bolt 27 and the elongated strap member 4 is fastened to a wood structural frame member 2 with 27 16 d sinker nails, the allowable load allowed according to the ICBO and other codes is 4,135 pounds in tension.

The ability of the tension tie 1 to transfer tension forces to anchor bolt 27 is superior to prior art connectors in the following manner. Referring to FIG. 8, assume an earthquake imposes an upward force on structural frame member 2 as indicated by the arrow 56. The upward force would be transferred to fasteners 26 in shear and thence downwardly through elongated strap member 4 to back bend line 21. As may be understood, an upward force along bend line 21 of third seat member 20 would be exerted tending to bend first, second third and fourth seat members 14, 17, 20 and 23 upwardly. The upward force on the seat members is resisted, however, by nut 31 threadably engaged to bolt member 27. Since the upward force indicated by arrow 56 is first transferred to third seat member 20 which is the lower most washer, and since first, second and fourth washers 14, 17, and 23 are all above third seat member 20, the resistance to bending is maximized by all of the seat members acting in concert due to the locking function provided by fourth seat member 23 being integrally attached to third seat member 20 and seat extension member 29 and bent 180° back upon itself locking and clamping all of the seat members. Thus there are the thicknesses of four seat members 14, 17, 20 and 23 resisting bending when upward forces as indicated by arrow 56 are imposed by cataclysmic events such as earthquakes, hurricanes and tornadoes.

I claim:

1. A single piece tension tie connection for tying a wood, or steel structural frame member to a wood, steel or concrete structural base member comprising:

a. an elongated strap member having a distal end and a proximal end, first and second spaced side edges and a generally planar face;

b. a first side member having a generally triangular shape integrally connected to a portion of said first side edge of said elongated strap member along a first side-generally 90° bend line;

c. a second side member having a generally triangular shape integrally connected to a portion of said second side edge of said elongated strap member along a second side generally 90° bend line and positioned in generally parallel spaced relation to said first side member;

d. a first seat member integrally connected to a portion of said first side member along a first seat bend lie and formed with a first seat opening therethrough;

e. a second seatsmember integrally connected to a portion of said second side member along a second seat bend line for overlapping registration with said first seat member and formed with a second seal opening therethrough located for general registration with said first seat opening;

f. a third seat member integrally connected to said proximal end of said elongated strap member at a generally 90° back bend line for underlapping said first and second seat members and formed with a third seat opening therethrough located for general registration with said first and second seat openings;

g. a fourth seat member integrally connected to said third seat member at a fourth seat bend line for overlapping said first, second and third seat members and formed with a fourth seat opening therethrough located for general registration with said first, second, and third seat openings;

h. shear fastener means for insertion through said elongated strap member for connection to said structural frame member; and i. tension fastener means for insertion through said first, second, third and fourth seat openings for attachment of said single piece tension tie to said structural base member.

2. A single piece tension tie as described in claim 1 comprising:

a. said tension fastener means is formed at its proximal end with bolt threads; and b. a threaded nut dimensioned for threadable engagement with said bolt threads for clamping engagement with said seat members.

3. A single piece tension tie as described in claim 1 comprising:

a. a seat extension member connected to said third seat member and said fourth seat member formed in a 180° curved bend between said generally third seat bend line and a fourth seat bend line.

4. A single piece tension tie as described in claim 1 comprising:

a. said first side bend line and said second side bend line are formed as converging lines resulting in a tapering of said elongated strap member in said proximal end portion.

5. A single piece tension tie as described in claim 1 comprising:

a. weakened bend line means formed along said generally 90° back bend line.

6. A single piece tension tie as described in claim 5 comprising:

a. said first seat bend line is superposed above said back bend line, and second seat bend line is superposed above said first seat bend line.

7. A single piece tension tie as described in claim 6 comprising:

a. first notch formed in the seat end of said first side bend line; and b. a second notch formed in the seat end of said second side bend line.

* * * * *

UNITED STATES PATENT AND TRADEMARK OFFICE
CERTIFICATE OF CORRECTION

PATENT NO. : 5,467,570
DATED : November 21, 1995
INVENTOR(S) : William F. Leek

It is certified that error appears in the above-identified patent and that said Letters Patent is hereby corrected as shown below:

Column 1, line 53, after the word "Fig. 2" insert the words ---is a---

Column 5, line 9, after the words "first seat bend" delete "lie"
 insert ---line---

Column 5, line 11, after the words "a second" delete "seatsmember"
 insert ---seat member---

Column 5, line 14, after the words "with a second" delete "seal"
 insert ---seat---

Signed and Sealed this

Twelfth Day of March, 1996

Attest:

BRUCE LEHMAN

*Attesting Officer*    *Commissioner of Patents and Trademarks*